(12) United States Patent
Lee et al.

(10) Patent No.: US 10,106,677 B2
(45) Date of Patent: Oct. 23, 2018

(54) THERMOPLASTIC RESIN COMPOSITION AND MOLDED PRODUCT OBTAINED BY APPLYING SAME

(71) Applicant: LG CHEM, LTD., Seoul (KR)

(72) Inventors: Soo Kyeong Lee, Daejeon (KR); Seung Cheol Ryoo, Daejeon (KR); Seong Lyong Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 87 days.

(21) Appl. No.: 15/309,719

(22) PCT Filed: Nov. 24, 2015

(86) PCT No.: PCT/KR2015/012611
§ 371 (c)(1),
(2) Date: Nov. 8, 2016

(87) PCT Pub. No.: WO2016/085222
PCT Pub. Date: Jun. 2, 2016

(65) Prior Publication Data
US 2017/0260382 A1    Sep. 14, 2017

(30) Foreign Application Priority Data

Nov. 28, 2014  (KR) .......................... 10-2014-0169093

(51) Int. Cl.
| | | |
|---|---|---|
| C08L 55/02 | (2006.01) | |
| C08L 25/16 | (2006.01) | |
| C08L 51/04 | (2006.01) | |
| B29C 49/00 | (2006.01) | |
| C08L 33/20 | (2006.01) | |
| B29K 25/00 | (2006.01) | |

(52) U.S. Cl.
CPC .......... *C08L 25/16* (2013.01); *B29C 49/0005* (2013.01); *C08L 33/20* (2013.01); *C08L 51/04* (2013.01); *C08L 55/02* (2013.01); *B29K 2025/08* (2013.01); *C08L 2205/025* (2013.01); *C08L 2205/03* (2013.01); *C08L 2205/035* (2013.01)

(58) Field of Classification Search
CPC ..................................................... C08L 55/02
See application file for complete search history.

(56) References Cited

U.S. PATENT DOCUMENTS

| | | | |
|---|---|---|---|
| 3,010,936 A | 11/1961 | Irvin | |
| 3,367,995 A | 2/1968 | Yoshino et al. | |
| 4,659,790 A | 4/1987 | Shimozato et al. | |
| 4,757,109 A | 7/1988 | Kishida et al. | |
| 4,774,287 A | 9/1988 | Shimozato et al. | |
| 4,972,032 A | 11/1990 | Henton et al. | |
| 5,414,045 A | 5/1995 | Sue et al. | |
| 5,569,709 A | 10/1996 | Sue et al. | |
| 6,774,166 B1 * | 8/2004 | Eichenauer | ............... C08K 5/01 524/231 |
| 2003/0032747 A1 | 2/2003 | Lee et al. | |
| 2005/0009970 A1 | 1/2005 | Seidel et al. | |
| 2007/0083024 A1 * | 4/2007 | Ebara | .................... C08F 212/04 526/346 |
| 2008/0033118 A1 * | 2/2008 | Kobayashi | ............. C08K 5/103 525/450 |
| 2010/0240851 A1 | 9/2010 | Sohn et al. | |
| 2012/0184635 A1 | 7/2012 | Eberstaller et al. | |
| 2014/0296437 A1 * | 10/2014 | Hatae | ..................... C08F 20/00 525/65 |

FOREIGN PATENT DOCUMENTS

| | | | |
|---|---|---|---|
| CN | 1455786 | A | 11/2003 |
| CN | 101121766 | A | 2/2008 |
| CN | 101711261 | A | 5/2010 |
| CN | 103613877 | A | 3/2014 |
| EP | 2937366 | A1 | 10/2015 |
| JP | 58-206657 | A | 12/1983 |
| JP | 63-162708 | A | 7/1988 |
| JP | 63-235350 | A | 9/1988 |
| JP | 64024879 | A | 1/1989 |
| JP | 08253651 | A | 10/1996 |
| JP | 10-36626 | A | 2/1998 |
| JP | 10265642 | A | 10/1998 |
| JP | 2000038427 | A | 2/2000 |
| JP | 2001-279049 | A | 10/2001 |

(Continued)

*Primary Examiner* — Jeffrey C Mullis
(74) *Attorney, Agent, or Firm* — Dentons US LLP

(57) ABSTRACT

The present invention relates to a thermoplastic resin composition with excellent chemical resistance and, more specifically, to a resin composition for blow molding and a molded product obtained by molding the same, the composition maintaining the balance of flowability and impact resistance and improving chemical resistance by controlling the glass transition temperature (Tg) and the weight average molecular weight (Mw) of an α-methylstyrene (AMS)-based heat-resistant resin in a copolymer of vinyl cyanide compound-rubbery polymer-aromatic vinyl compound, having reinforced heat resistance, particularly, in an acrylonitrile-butadiene-styrene (ABS) copolymer resin. According to the present invention, an ABS resin composition for blow molding, having excellent chemical resistance while maintaining the balance of flowability, impact resistance and heat resistance to be of at least the same level, and a molded product obtained by applying the same can be obtained.

10 Claims, No Drawings

(56) References Cited

FOREIGN PATENT DOCUMENTS

| | | |
|---|---|---|
| JP | 2002161185 A | 6/2002 |
| JP | 2002-356594 A | 12/2002 |
| JP | 2003181985 A | 7/2003 |
| JP | 2007224287 A | 9/2007 |
| KR | 10-1998-0073191 A | 11/1998 |
| KR | 10-2001-0062876 A | 7/2001 |
| KR | 10-2003-0005981 A | 1/2003 |
| KR | 10-2005-0091200 A | 9/2005 |
| KR | 10-0543089 B1 | 1/2006 |
| KR | 10-2006-0028421 A | 3/2006 |
| KR | 10-0561339 B1 | 3/2006 |
| KR | 10-0838453 B1 | 6/2008 |
| KR | 10-2011-0039706 A | 4/2011 |
| KR | 10-2012-0016341 A | 2/2012 |
| KR | 10-2012-0029156 A | 3/2012 |
| KR | 10-2012-0048601 A | 5/2012 |
| KR | 10-1277293 B1 | 6/2013 |
| KR | 10-1466148 B1 | 11/2014 |

\* cited by examiner

THERMOPLASTIC RESIN COMPOSITION AND MOLDED PRODUCT OBTAINED BY APPLYING SAME

This application is a National Stage Application of International Application No. PCT/KR2015/012611 filed on Nov. 24, 2015, which claims the benefit of Korean Patent Application No. 10-2014-0169093 filed on Nov. 28, 2014, all of which are hereby incorporated by reference in their entirety for all purposes as if fully set forth herein.

TECHNICAL FIELD

This application claims the benefit of priority based on Korean Patent Application No. 10-2014-0169093 filed on Nov. 28, 2014, the full disclosure of which is incorporated as a part of this specification.

The present invention relates to a styrene-based thermoplastic resin composition having excellent chemical resistance, more specifically, to a resin composition for blow molding, wherein a heat-resistant resin is added to a graft copolymer resin of a vinyl cyanide compound-rubbery polymer-aromatic vinyl compound to reinforce heat resistance, while balance of flowability and impact resistance is maintained and chemical resistance is improved by controlling the glass transition temperature (Tg) and the weight average molecular weight (Mw), and a molded product by molding the same.

BACKGROUND ART

A styrene-based thermoplastic resin is a resin synthesized by homo-polymerizing styrene as a main raw material or co-polymerizing it with monomers to obtain advantages from properties of each monomer.

As the styrene-based resin, there are general purpose polystyrene (GPPS) resins and expendable polystyrene (EPS) resins obtained by homopolymerizing styrene, high impact polystyrene (HIPS) resins and styrene-butadiene rubber (SBR) resins being copolymers of styrene and butadiene rubber, and ABS resins obtained by grafting styrene and acrylonitrile to a butadiene rubber.

In addition, there are ASA resins obtained by co-polymerizing styrene and acrylonitrile with an acrylic rubber as a base, MBS-based impact reinforcing agents or transparent ABS resins obtained by co-polymerizing styrene and methyl methacrylate (MMA) with polybutadiene as a base, or acrylic-based impact reinforcing agents obtained by co-polymerizing methyl methacrylate (MMA) and an acrylate monomer with an acrylic rubber as a base. Styrene has an advantage in processability, butadiene has an advantage in impact resistance, and acrylonitrile has advantages in rigidity and chemical resistance.

Styrene-based thermoplastic resin compositions are utilized in various applications. Rubber reinforced styrene-based resins, in particular ABS resins are used widely in electric and electronic components, office appliances, automotive components, etc. due to their excellent mechanical properties, molding processability, and the like.

ABS resins for injection is generally prepared as pellets by kneading ABS copolymers polymerized via emulsion polymerization (acrylonitrile-butadiene-styrene, hereinafter referred to as 'emulsion polymerized ABS') and styrene-acrylonitrile copolymer having a weight average molecular weight of 60,000 to 180,000, polymerized via bulk polymerization (styrene-acrylonitrile, hereinafter referred to as 'bulk polymerized SAN') and extruding them, and then used by injecting the pellets to process in a predetermined shape.

Usually, the emulsion polymerized ABS is produced to have the content of the rubbery polymer in the range of 40 to 60% by weight. When it is used in housing articles of electric and electronic products, or toys, it is possible to produce articles by modulating an appropriate ratio of the emulsion polymerized ABS and the bulk polymerized SAN depending on applications to prepare pellets via the extrusion procedure, and then injecting molten resin into a mold using an injection machine.

In case of ABS resins used for refrigerator sheets, they are produced as molded products by a blow molding method through extrusion in a form of sheet after kneading the emulsion polymerized ABS and the bulk polymerized SAN having a glass transition temperature in the range of 95 to 110° C. and a weight average molecular weight of 80,000 to 200,000, or, if necessary, the emulsion polymerized SAN having a weight average molecular weight of 200,000 to 2,000,000, to prepare pellets via the extrusion procedure.

Meanwhile, the ABS resins for blow molding used to manufacture automotive spoilers require low melt viscosity and high heat deflection temperature. Accordingly, with the emulsion polymerized ABS, the emulsion polymerized α-methylstyrene-acrylonitrile having a weight average molecular weight in the range of 150,000 to 250,000 (AMS heat-resistant SAN) is used alone or in combination with the bulk polymerized α-methylstyrene-acrylonitrile having a weight average molecular weight in the range of 80,000 to 200,000 (AMS heat-resistant SAN) to control the melt viscosity. In order to meet the required high heat deflection temperature, N-phenylmaleimide (PMI)-based copolymers (PMI heat-resistant SAN) is used in combination. Especially, α-methylstyrene-acrylonitrile copolymer having a weight average molecular weight of 150,000 or more is produced by emulsion polymerization, because it is very difficult to be produced by bulk polymerization due to its high melt viscosity.

A process for preparing automotive spoilers is to produce molded products by a blow molding method after preparing parisons through extrusion. It is possible to prepare ABS resins for blow molding to be used for manufacturing the automotive spoilers with only the existing bulk polymerized heat-resistant SAN having a weight average molecular weight of about 80,000 to 200,000. In this case, the ABS for blow molding has such low melt viscosity that parison sag can occur during the formation of the parison and uneven wall thickness of the molded product can become severe when blowing the parison. Moreover, due to degradation of chemical resistance while painting the spoiler product after molding, a cracking phenomenon occurs in a thin portion of the molded products over time during use after mounting on a car to cause spoiler crack defects.

DETAILED DESCRIPTION OF INVENTION

Technical Problem

The present invention is intended to provide a heat-resistant ABS resin for blow molding, which is used for manufacturing an automotive spoiler and has impact strength (¼") of 15 kg·cm/cm or more, a heat deflection temperature (¼") of 100° C. or more, flowability of 0.5 to 3.0 g/10 min, and elongation retention after application of a thinner for painting of 40% or more.

Specifically, an automotive spoiler is subjected to a process for sanding and painting surfaces for an elegant appearance and reinforcement of scratch resistance and weather resistance, following blow molding to have a shape. At this time, inner residual stress of the ABS resin may not be completely removed, hence the surface of the ABS resin is eroded by the thinner included in the paint on painting to degrade a physical property markedly. The eroded surface may become crazes or cracks over time to cause defects.

Even if ABS resin for blow molding has been designed to have high initial physical properties, when environmental stress-cracking resistance (ESCR) of the resin itself is lowered, a defect that products are broken is aroused because the inner residual stress is focused in micro-crazings caused on painting, which develop into cracks over time. The physical property, which is most sensitively changed to micro-craizings or micro-cracks on painting, is elongation. As the value of elongation after painting is lower compared to the initial value of elongation, the probability of occurring cracks by the painting erosion is higher.

To reinforce the environmental stress-cracking resistance (ESCR), resins for blow molding usually employ a heat-resistant SAN resin raw material having high molecular weight. However, when only the heat-resistant SAN resin having a weight average molecular weight of 220,000 or more is used, the ESCR is improved, but flowability is excessively lowered to reduce productivity, the release rate of the inner residual stress gets slow, and the temperature of the melt resin is excessively raised by the excessive frictional force due to a high molecular weight in the production process to cause degradation of the resin. In addition, there is a problem wherein the impact strength is lowered due to constraint of polymer chains.

Furthermore, when only the heat-resistant SAN resin having a weight average molecular weight of 150,000 is used, the ABS resin for blow molding has such a low melt viscosity that the parison sag occurs in a procedure of manufacturing parisons. In addition, uneven thickness of the molded product becomes severe when the parisons are blown, and probability of crack defects during painting of the molded spoiler rises due to deterioration of chemical resistance.

In addition to the above mentioned method of increasing a molecular weight, methods such as increasing a content of the rubbery polymer and increasing a particle size of the rubbery polymer have been conventionally used to improve chemical resistance, but there remains still a problem of heat resistance.

Technical Solution

The present invention is contrived to solve the above problems, and provides a resin composition comprising the emulsion polymerized ABS and 30% or more by weight of the α-methylstyrene (AMS)-based emulsion polymerized heat-resistant SAN resin having a glass transition temperature of 125° C. or more and a weight average molecular weight of 150,000 to 250,000 to improve heat resistance and chemical resistance of the thermoplastic resin composition for blow molding.

At this time, to modulate the melt viscosity characteristic in an appropriate level according to the customer needs, it may further comprise 30% or less by weight of the α-methylstyrene-based bulk polymerized heat-resistant SAN resin having a glass transition temperature of less than 125° C. and a weight average molecular weight of 80,000 or more and less than 150,000, and 0 to 10% by weight of N-phenylmaleimide (PMI)-based polymer to satisfy the heat resistance.

In addition, to maintain the impact resistance in an equivalent level or higher, the content of the rubbery polymer in the thermoplastic resin composition for blow molding was modulated in the range of 30 to 75% by weight.

Effects of Invention

The present invention provides a thermoplastic resin for blow molding having an excellent chemical resistance with a balanced flowability, impact resistance and heat resistance in an equivalent level or higher, and the molded product applying the same.

BEST MODE FOR CARRYING OUT INVENTION

The present invention will be explained in more detail via examples below. It would be apparent to a person of ordinary skill in the art that these examples are only intended to describe the present invention more specifically and the scope of the present invention according to the subject of the present invention is not limited by these examples.

The present invention relates to a thermoplastic resin composition having excellent chemical resistance, more specifically, to a resin composition for blow molding, wherein a heat-resistant resin is added to a graft copolymer resin of a vinyl cyanide compound-rubbery polymer-aromatic vinyl compound to reinforce heat resistance, while balance of flowability and impact resistance is maintained and chemical resistance is improved by controlling the glass transition temperature (Tg) and the weight average molecular weight (Mw), and a molded product by molding the same.

Hereinafter, the thermoplastic resin composition of the present invention is explained in detail.

1. Graft Copolymer Resin 1-1. Configuration

The graft copolymer resin of the present invention is a copolymer wherein an aromatic vinyl compound and a vinyl cyanide compound are grafted to a rubbery polymer.

The rubbery copolymer is not restricted in its configuration, but may employ at least one selected from the group consisting of diene-based rubbers such as polybutadiene, polystyrene-butadiene and polyacrylonitrile-butadiene, saturated rubbers that hydrogen is added to the diene-based rubbers, acrylic rubbers such as C1-C8 alkyl acrylate, polybutyl acrylate and ethylhexyl acrylate, isoprene rubbers, chloroprene rubbers, ethylene-propylene (EPM) rubbers and ethylene-propylene-diene monomers (EPDM) rubbers, and preferably polybutadiene rubber among the diene-based rubbers.

The content of the rubbery polymer is not limited in the present invention, but is 30 to 75% by weight, preferably 40 to 60% by weight based on the total weight of the graft copolymer resin. When using the above rubbery polymer, the graft copolymer has not only high graft ratio, but also the molded product being finally prepared has excellent impact strength and chemical resistance.

The aromatic vinyl compound which is grafted to the rubbery polymer is not restricted in its configuration, but may employ at least one selected from the group consisting of styrene, α-methylstyrene, β-methylstyrene, p-methylstyrene, ethylstyrene, hydroxystyrene, vinyl xylene, monochlorostyrene, dichlorostyrene, dibromostyrene and vinylnaphthalene, and preferably styrene.

The content of the aromatic vinyl compound is not limited in the present invention, but is suitably 30 to 94% by weight based on the total weight of the graft copolymer resin, and in the above range it is possible to efficiently raise the graft ratio with the rubbery polymer.

The vinyl cyanide compound being grafted to the rubbery polymer is not restricted in its configuration, but may employ at least one selected from saturated nitriles such as acrylonitrile and unsaturated nitriles such as methacrylonitrile and ethacrylonitrile, and preferably acrylonitrile.

The content of the vinyl cyanide compound is not limited in the present invention, but is suitably 10 to 40% by weight based on the total weight of the graft copolymer resin, and in the above range it is possible to efficiently raise the graft ratio with the rubbery polymer.

Most preferably, the acrylonitrile-butadiene-styrene (hereinafter, referred to as "ABS") resin wherein acrylonitrile and styrene are grafted to a butadiene rubbery polymer can be used, which represents physical properties such as impact resistance and heat resistance outstandingly. The ABS resin used in one embodiment of the present invention is one that styrene-acrylonitrile (SAN) is grafted to a butadiene rubber as in Formula 1 below.

[Formula 1]

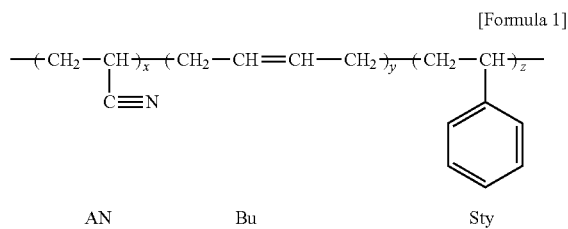

AN      Bu      Sty

In this specification the "ABS resin" is not necessarily designated to only acrylonitrile-butadiene-styrene copolymer (ABS) resin, and in certain situations it is evident that it can be broadly interpreted to include a resin composed of a copolymer of vinyl cyanide compound-rubbery polymer-aromatic vinyl compound.

1-2. Factors that Affect Physical Properties (i) Content of Rubbery Polymer

The content of the rubbery polymer for satisfying flowability suitable as the thermoplastic resin for blow molding, chemical resistance for a painting process after molding and impact resistance as the final product together is 30 to 75% by weight, preferably 40 to 60% by weight based on the total weight of the graft copolymer resin. In the above range the flowability of the resin is not lowered, the effect of reinforcing impact is also excellent, and the graft copolymer molded product being finally prepared represents excellent impact strength and chemical resistance.

(ii) Particle Size of Rubbery Polymer

The rubbery polymer having a large particle size must be used to obtain the thermoplastic resin having excellent impact resistance and processability, whereas the rubbery polymer having a small particle size must be used to obtain the thermoplastic resin having excellent surface gloss.

The resin used in the present invention may have the average particle size of the rubbery polymer in the range of 0.1 to 1.5 μm by Z-average for excellent impact resistance, processability and surface gloss as the thermoplastic resin for blow molding.

(iii) Gel Content of Rubbery Polymer

Although the gel content of the rubbery polymer is not particularly restricted, as the gel content is lower, monomers inside the rubbery polymer swell more to occur polymerization, and thus the apparent particle size is increased to improve the impact strength. Whereas the gel content is higher, the apparent particle size is decreased to represent excellent surface gloss.

Without setting limitation on the gel content in the present invention, in case of obtaining components by the emulsion polymerization, the gel content is preferably 30 to 98% by weight, and in the above range the thermoplastic resin composition may be obtained, which can especially provide molded products having excellent chemical resistance and impact resistance.

In addition, the gel content can be calculated according to the following method.

First, 1 g of the rubbery polymer is introduced to 100 ml of toluene to be settled at room temperature for 48 hours, and then filtered through 100 mesh metal screen (weight referred to as $W_1$). The toluene insolubles and the metal screen are dried in vacuum at 80° C. for 6 hours, weighed (weight referred to as $W_2$). The gel content is calculated according to the following Equation 1.

$$\text{Gel content (\% by weight)} = [\{W_2(g) - W_1(g)\}/1(g)] \times 100 \quad \text{Equation 1)}$$

(iv) Graft Ratio

When preparing the graft ABS resin, the graft ratio influences highly on the physical properties. Hence, it is preferred to use the ABS resin having a graft ratio of 25 to 55% in the present invention. If the graft ratio is less than 25%, rubber particles collide with one another to form the aggregated rubber due to the presence of a large amount of the rubber latex which is not grafted and exposed, and thereby weather resistance and transparency are lowered. Whereas if the graft ratio is more than 55%, thermal stability is lowered and impact efficiency does have no more gain.

The graft ratio is not limited in the present invention. Generally the graft ratio may be derived by applying the grafted monomer weight (referred to as $W_3$) and the weight up to the core polymer (referred to as $W_4$) to the following equation 2.

$$\text{Graft ratio (\%)} = \{W_3(g)/W_4(g)\} \times 100 \quad \text{Equation 2)}$$

1-3. Process for Preparation

As the process for preparing the graft ABS resin, emulsion polymerization, suspension polymerization, solution polymerization, bulk polymerization, a method using suspension polymerization and bulk polymerization together and a method using emulsion polymerization and bulk polymerization together, and the like have been known. Among these methods emulsion polymerization and bulk polymerization are commonly used in the production sites.

The ABS resin prepared by emulsion polymerization has excellent mechanical properties and gloss, but emulsifiers and flocculants which must be used due to the nature of processes for emulsion polymerization are not completely removed from coagulation and dewatering processes and remain in the final products to cause deterioration of physical properties. It is also difficult to treat contaminated water used as polymerization medium. Besides, emulsion polymerization needs separate coagulation and dewatering processes after polymerization, and thus it is uneconomical compared to the bulk polymerization being continuous processes.

Meanwhile, the ABS resin prepared by bulk polymerization has excellent moldability, dimensional stability and impact resistance of the molded products, thereby being applied in various fields such as home appliances, office appliances, and automotive components recently. It is used in the molded products having complex shape and thin thickness, and thus the higher impact resistance, gloss and flowability are required. Generally, in case of the ABS resin prepared by bulk polymerization, the rubbery polymer has larger particle size than that of the ABS resin prepared by emulsion polymerization. Therefore, the ABS resin prepared by bulk polymerization may have high impact resistance, but gloss is relatively poor.

The process for preparing the graft ABS resin of the present invention is not particularly limited to emulsion polymerization, bulk polymerization, solution polymerization and suspension polymerization. In one embodiment, the resin may be one prepared in a state of powder by subjecting a butadiene-based rubber, an acrylonitrile-based monomer and a styrene-based monomer to emulsion graft polymerization, coagulation, dewatering and dryness. It may be one prepared in a state of powder by introducing the monomer mixture consisting of 10 to 40 parts by weight of an acrylonitrile-based monomer and 30 to 94 parts by weight of a styrene-based monomer to the mixed solution consisting of 40 to 60 part by weight of a butadiene-based rubber having an average particle size of 0.1 to 1.5 μm, 0.6 to 2 parts by weight of an emulsifier, 0.2 to 1 part by weight of a molecular weight modifier and 0.05 to 0.5 parts by weight of a polymerization initiator continuously or in a lump, subjecting them to emulsion graft polymerization, coagulating the resultant with 5% aqueous sulfuric acid solution, and then dewatering and drying.

2. Heat-Resistant Copolymer 2-1. Kinds

General methods for providing the ABS resin with heat resistance include a method of adding α-methylstyrene-based or maleimide-based monomers having excellent heat resistance in the ABS polymerization process, and a method of mixing heat-resistant copolymers including the above monomers having excellent heat-resistant with the ABS resin. The copolymer having excellent heat resistance is usually prepared by copolymerizing or ternary copolymerizing the α-methylstyrene-based or maleimide-based monomer with a vinyl cyanide compound such as acrylonitrile and/or an aromatic vinyl compound monomer such as styrene.

Besides, a method of preparing the heat-resistant ABS resin by kneading the heat-resistant copolymer to the graft ABS resin has been proposed. As preparing methods for the heat-resistant ABS resin, a method of preparing the heat-resistant ABS resin by replacing some or all of styrene used on preparing the heat-resistant copolymer for kneading with α-methylstyrene having excellent heat resistance (U.S. Pat. Nos. 3,010,936 and 4,659,790), a method of preparing the heat-resistant ABS resin by including a maleimide compound (JP Laid-open Patent Publication Nos. SO58-206657, SO63-162708 and SO63-235350, and U.S. Pat. No. 4,757,109), a method of kneading with a polycarbonate resin and a method of filling inorganic materials, etc., are known.

The heat-resistant copolymer of the present invention is one prepared by copolymerizing an aromatic vinyl compound with a polymeric monomer having a heat-resistant property in a certain temperature range, or one prepared by copolymerizing a vinyl cyanide compound hereto additionally.

For example, the heat-resistant polymeric monomer may be at least one selected from the group consisting of α-methylstyrene, N-phenylmaleimide, N-phenyl maleic acid and styrene maleic acid anhydride. The heat-resistant resin in the present invention includes a copolymer comprising α-methylstyrene basically, and also a copolymer comprising N-phenylmaleimide additionally.

(i) α-Methylstyrene (Hereinafter Referred to as "AMS")-Based Polymer

As a heat-resistant copolymer of the present invention, AMS-based polymer is a copolymer of AMS and acrylonitrile (AN) as in Formula 2 below.

[Formula 2]

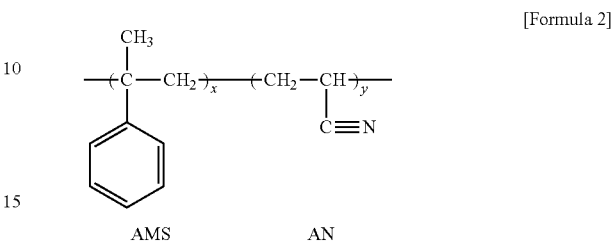

As the AMS-based polymer, the polymer prepared by copolymerizing 50 to 80 parts by weight of the AMS monomer and 20 to 50 parts by weight of acrylonitrile (AN) in a predetermined ratio is used.

If the content of the AMS monomer is less than 50 parts by weight, there may be a problem wherein the heat resistance is lowered and the color is changed to yellow on heating. If it is more than 80 parts by weight, there may be a problem wherein the resulting heat-resistant resin may be easily degraded with heat due to rapidly generated structure in the chain that three or more of AMS are combined in series ([AMS]-[AMS]-[AMS]: thermal decomposition structure).

Also, if the content of acrylonitrile (AN) is less than 20 parts by weight, there may be a problem that the conversion rate and the molecular weight are lowered. If it is more than 50 parts by weight, there may be a problem wherein an insoluble gel polymer in a solvent is created due to a large amount of acrylonitrile (AN) within the resin. Since the thermal stability of the gel polymer is very low and the gel polymer may act as a red or black foreign body on heating, and thus the appearance of the product is damaged.

The AMS-based polymer of the present invention may be 30 to 75% by weight, preferably 50 to 75% by weight, based on the total weight of the resin composition. If the content of the above AMS-based polymer is less than the above range, sufficient heat resistance cannot be obtained. Conversely, if it is more than the above range, there is a problem wherein flowability is not only lowered, but also impact strength and surface gloss are lowered due to the relative lack of the graft ABS.

As the AMS-based polymer of the present invention, the AMS-based polymer having 125° C. or more of the glass transition temperature and 150,000 to 250,000 of the weight average molecular weight is used alone in the range of 30 to 75% by weight, or with the AMS-based polymer having less than 125° C. of the glass transition temperature and 80,000 to less than 150,000 of the weight average molecular weight in the range of 30% or less by weight additionally.

(ii) N-Phenylmaleimide (Hereinafter Referred to as "PMI")-Based Polymer

The PMI-based polymer as the heat-resistant resin of the present invention may be a copolymer of N-(substituted) maleimide, a vinyl monomer and an unsaturated dicarboxylic acid. Usually, the PMI-based polymer is represented by a ternary copolymer of N-phenylmaleimide-styrene-maleic anhydride (PMI-styrene-maleic anhydride) as in Formula 3 below.

[Formula 3]

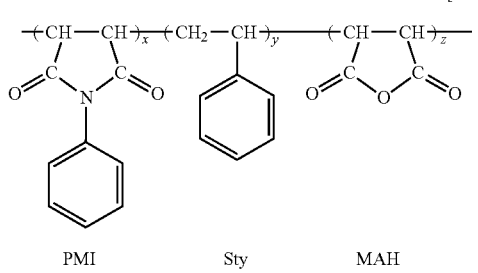

PMI      Sty      MAH

The above ternary copolymer of Formula 3 is composed of, preferably 45 to 55% by weight of phenylmaleimide (PMI), 40 to 50% by weight of styrene and 1 to 10% by weight of maleic anhydride, and most preferably 50% by weight of PMI, 45% by weight of styrene and 5% by weight of maleic anhydride, but is not limited to this in the present invention.

The PMI-based polymer of the present invention can be optionally applied to the above AMS-based polymer in the range of 0 to 10% by weight, and preferably has a glass transition temperature of 180 to 220° C. and a weight average molecular weight of 80,000 to 200,000 g/mol. In the above range, there are advantages to show the excellent heat resistance and the impact resistance, with the good extrusion and the flowability as well.

2-2. Factors that Affect Physical Properties (i) Glass Transition Temperature

If the glass transition temperature of the heat-resistant resin is equal to or higher than 125° C. as a standard temperature, the heat resistance of the resin is excellent, but the flowability is lowered. Therefore, there is an advantage in that the heat resistance is excellent as the heat-resistant resin included in the thermoplastic resin for blow molding, whereas there is a disadvantage in that the productivity is lowered due to decrease of flowability.

To solve above problem, the heat-resistant resin having the glass transition temperature of less than the standard temperature is mixed in a predetermined content ratio, the productivity may be complemented by improving the flowability, while maintaining the heat resistance in an excellent level.

(ii) Weight Average Molecular Weight

The heat-resistant resin of the present invention has a weight average molecular weight of 80,000 to 250,000. When it is less than 80,000, there is a problem wherein the chemical resistance and the heat resistance are lowered. When it is more than 250,000, the chemical resistance is improved, but the flowability is lowered that processing is not easy and thereby the productivity is lowered.

By applying the weight average molecular weight of the heat-resistant resin to the range of 150,000 to 250,000, a relatively high molecular weight resin may be prepared, and thus the chemical resistance and the impact resistance can be improved. That is, when the heat-resistant resin is included in the thermoplastic resin for blow molding, crazes or cracks by the thinner in the subsequent painting process can be effectively prevented.

Meanwhile, when the relatively low molecular weight resin having the weight average molecular weight in the range of 80,000 to less than 150,000 is prepared and mixed in a predetermined content ratio to complement the problem of flowability due to the relatively high molecular weight, the productivity is complemented by improving the flowability, while maintaining the chemical resistance and the impact resistance in an excellent level.

2-3. Process for Preparation

As in the process for preparing the ABS resin mentioned above, the various processes are also possible for preparing the heat-resistant resin, but emulsion polymerization and bulk polymerization of these methods are commonly used in the production sites.

U.S. Pat. Nos. 3,010,936, 3,367,995 and 4,774,287 disclose methods of preparing copolymer resins with excellent heat resistance by emulsion polymerization. Especially, the AMS-based resin is generally prepared by emulsion polymerization, kneaded and used. This method is excellent in view of economic efficiency and impact resistance, but there is a problem that the reaction temperature is low and the long reaction time is required due to the nature of emulsion polymerization of AMS, and thermal stability is so low that a large amount of gas is generated and gloss is lowered.

Accordingly, U.S. Pat. No. 5,414,045 and U.S. Pat. No. 5,569,709 disclose methods of preparing the AMS resins by bulk polymerization to improve the problems of the emulsion polymerization. These methods have an advantage in that they can obtain high pure polymers with high polymerization degree. However, they have disadvantages in that viscosity or polymerization rate increases as the reaction progresses, and molecular weight distribution are wide, and the polymers are colored by the side reaction.

Therefore, when the heat-resistant resins prepared by the emulsion polymerization and the bulk polymerization are mixed in a predetermined ratio, it can be expected to have function for complementing each disadvantage. Accordingly, in the present invention, the AMS resin prepared by the emulsion polymerization was basically used, while the AMS resin prepared by the bulk polymerization was additionally used.

Hereinafter, the present invention is explained in detail via examples.

1. Preparation of Thermoplastic Resin Composition

A. ABS Base Resin

The ABS (SR172, manufacturer: LG CHEM, Ltd.) prepared via the emulsion polymerization and having the rubbery polymer content of 60% was used as a copolymer in which an aromatic vinyl compound and a vinyl cyanide compound are grafted to a conjugated dien rubbery polymer.

B. AMS-Based Heat-Resistant Resin

B-1. The AMS heat-resistant resin (PW635, manufacturer: LG CHEM, LTD.) prepared by the emulsion polymerization and having a glass transition temperature of 130° C. and a weight average molecular weight of 170,000 was used.

B-2. The AMS heat-resistant resin (98UHM, manufacturer: LG CHEM, LTD.) prepared by the bulk polymerization and having a glass transition temperature of 120° C. and a weight average molecular weight of 100,000 was used.

C. PMI-Based Heat-Resistant Resin

The PMI heat-resistant resin (MS-NB, manufacturer: Denka) having a glass transition temperature of 201° C. and a weight average molecular weight of 150,000 was used.

2. Preparation of the Compositions

Examples 1 to 3 and Comparative Examples 1 and 2 below were prepared by fixing the content of ABS resin (A) and formulating the AMS-based heat-resistant resins (B-1, B-2) having different glass transition temperature and weight average molecular weight and PMI-based heat-resistant resin (C) according to the component ratios shown in Table 1 below. In Table 1, A, B-1, B-2 and C are the thermoplastic resins prepared above.

TABLE 1

|  | Example 1 | Example 2 | Example 3 | Comparative Example 1 | Comparative Example 2 |
|---|---|---|---|---|---|
| A | 38 | 38 | 38 | 38 | 38 |
| B-1 | 62 | 61 | 40 | 28 | 0 |
| B-2 | 0 | 10 | 20 | 31 | 62 |
| C | 0 | 1 | 2 | 3 | 0 |
| Total (% by weight) | 100 | 100 | 100 | 100 | 100 |

Example 1

The copolymers, resins, etc., as prepared above were used. The composition was prepared by fixing (A) ABS base resin (SR172, manufacturer: LG CHEM, LTD.) to 38% by weight, and just changing some in these contents, that is, (B-1) AMS-based heat-resistant resin (PW635, manufacturer: LG CHEM, LTD.) to 62% by weight.

Example 2

The copolymers, resins, etc., as prepared above were used. The composition was prepared by fixing (A) ABS base resin (SR172, manufacturer: LG CHEM, LTD.) to 38% by weight, and just changing some in these contents, that is, (B-1) AMS-based heat-resistant resin (PW635, manufacturer: LG CHEM, LTD.) to 51% by weight, (B-2) AMS-based heat-resistant resin (98UHM, manufacturer: LG CHEM, LTD.) to 10% by weight, and (C) PMI-based heat-resistant resin (MS-NB, manufacturer: Denka) to 1% by weight.

Example 3

The copolymers, resins, etc., as prepared above were used. The composition was prepared by fixing (A) ABS base resin (SR172, manufacturer: LG CHEM, LTD.) to 38% by weight, and just changing some in these contents, that is, (B-1) AMS-based heat-resistant resin (PW635, manufacturer: LG CHEM, LTD.) to 40% by weight, (B-2) AMS-based heat-resistant resin (98UHM, manufacturer: LG CHEM, LTD.) to 20% by weight, and (C) PMI-based heat-resistant resin (MS-NB, manufacturer: Denka) to 2% by weight.

Comparative Example 1

The copolymers, resins, etc., as prepared above were used. The composition was prepared by fixing (A) ABS base resin (SR172, manufacturer: LG CHEM, LTD.) to 38% by weight, and just changing some in these contents, that is, (B-1) AMS-based heat-resistant resin (PW635, manufacturer: LG CHEM, LTD.) to 28% by weight, (B-2) AMS-based heat-resistant resin (98UHM, manufacturer: LG CHEM, LTD.) to 31% by weight, and (C) PMI-based heat-resistant resin (MS-NB, manufacturer: Denka) to 3% by weight.

Comparative Example 2

The copolymers, resins, etc., as prepared above were used. The composition was prepared by fixing (A) ABS base resin (SR172, manufacturer: LG CHEM, LTD.) to 38% by weight, and just changing some in these contents, that is, (B-2) AMS-based heat-resistant resin (PW635, manufacturer: LG CHEM, LTD.) to 62% by weight.

3. Measurement of Physical Properties

Table 2 below shows the results of measuring physical properties of flow index (g/10 min), impact strength (kg·cm/cm), heat deflection temperature (HDT, ° C.) and elongation retention (%) about specimens for measuring manufactured by kneading the above compositions of Examples 1 to 3 and Comparative Examples 1 and 2 in a twin-screw extruder at 240, followed by injection.

TABLE 2

|  | Example 1 | Example 2 | Example 3 | Comparative Example 1 | Comparative Example 2 |
|---|---|---|---|---|---|
| Flow Index (g/10 min) | 1.3 | 1.6 | 1.9 | 1.9 | 2.5 |
| Impact Strength (kg · cm/cm) | 23 | 24 | 22 | 16 | 22 |
| HDT (° C.) | 106 | 105 | 105 | 103 | 101 |
| Elongation Retention (%) | 71 | 87 | 41 | 19 | 30 |

The evaluation conditions of physical properties in the present invention are as follows.

(1) Flow index: it was calculated from the extrusion output (g) per 10 minutes measured at 220° C. under a load of 10 kg according to ASTM D1238.

(2) Impact strength: it was measured on a specimen having a thickness of ¼" (6.35 mm) and the formed notch using an IZOD impact strength tester (manufacturer: TINIUS OLSEN) according to ASTM D256.

(3) Heat deflection temperature (HDT): it was measured for a specimen having a thickness of ¼" (6.35 mm) under a load of 18.6 kgf/cm$^2$ and a temperature elevation rate of 120/hr according to ASTM D648-07.

(4) Elongation retention: it was calculated by Equation 3 below applying the elongation measured by fixing a specimen on 1.7% strain curvature jig, applying NOROOBEE T-803 thinner thereon and removing the specimen from the jig after 10 minutes according to ASTM D638-10.

elongation retention (%)=(elongation after application of thinner/elongation before application of thinner)×100     Equation 3)

Table 1 and Table 2 above show the results from compositions formulated to comprise of (B-1), (B-2) AMS-based heat-resistant resin and/or (C) PMI-based heat-resistant resin in a predetermined composition ratio as 62% of the heat-resistant resin, regarding (A) 38% by weight of ABS base resin. The present invention relates to the thermoplastic resin compositions for blow molding and the molded products, and resin compositions should have the following requirements to have suitable characteristics.

First, the flow index should be in the range of 0.5 to 3.0 g/10 min. When the flow index is less than 0.5 g/10 min, problems such as difficulty in molding process, and deterioration of physical properties according to the resin degradation due to excessive frictional heat are developed. If flowability is more than 3.0 g/10 min, the sagging problem in the resin tubes (parisons) of the blow molding process is developed, and thus the above range is most preferable.

Second, the chemical resistance should be excellent for painting processes. If the chemical resistance of the resin is low, micro-crazings occur by painting erosion on painting, and the residual stress inside the resin cause the crack generation. In the present invention, the elongation retention 10 minutes after applying the thinner to the resin should be 40% or higher.

Third, the heat resistance and the impact resistance should be maintained to the equivalent level or higher. The heat deflection temperature (HDT) is preferably in the range of 100 to 120° C. and the impact strength is preferably in the range of 20 to 35 kg·cm/cm.

The results of Table 1 and Table 2 above show that the flow index is increased and the heat deflection temperature is lowered, as the content of the AMS-based heat-resistant resin B-1 reduces and the content of the AMS-based heat-resistant resin B-2 increases. It can be seen that a relatively high glass transition temperature and a relatively large weight average molecular weight are factors which improve heat resistance, but lower flowability. That is, it is expected to be capable of increasing the lowered flowability in an appropriate level by adding the AMS-based heat-resistant resins having a relatively low glass transition temperature and a relatively small weight average molecular weight.

Based on the results of Examples and Comparative Examples above, the present invention provides a resin composition for blow molding comprising 25 to 50% by weight of the ABS resin having the rubbery polymer content of 40 to 60% by weight, 30 to 75% by weight of the AMS-based heat-resistant resin having a glass transition temperature of 125° C. or more and a weight average molecular weight of 150,000 to 250,000, 0 to 30% by weight of the AMS-based heat-resistant resin having a glass transition temperature of less than 125° C. and a weight average molecular weight of 80,000 to less than 150,000 and 0 to 10% by weight of the PMI-based heat-resistant resin. At this time, the above AMS-based heat-resistant resin may be one prepared by emulsion polymerization or bulk polymerization.

The invention claimed is:

1. A molded product molded by blow molding process using a thermoplastic resin composition,
   wherein the thermoplastic resin composition comprises:
   25 to 50% by weight of a graft copolymer resin of a vinyl cyanide compound-rubbery polymer-aromatic vinyl compound; and
   30 to 75% by weight of α-methylstyrene-based heat-resistant resin having a glass transition temperature (Tg) of 125° C. or more and a weight average molecular weight (Mw) of 150,000 to 250,000,
   wherein the molded product has flow index of 0.5 to 3.0 g/10 min in accordance with ASTM D1238: [provided extrusion output (g) per 10 minutes is measured at 220° C. under a load of 10 kg].

2. The molded product according to claim 1, characterized in that said graft copolymer resin is the ABS resin wherein acrylonitrile and styrene are grafted to a butadiene rubbery polymer.

3. The molded product according to claim 1, characterized in that said graft copolymer resin has the rubbery polymer content of 40 to 60% by weight.

4. The molded product according to claim 1, characterized in that said heat-resistant resin is prepared by emulsion polymerization.

5. The molded product according to claim 1, characterized in that said thermoplastic resin composition further comprises 0 to 30% by weight of α-methylstyrene-based heat-resistant resin having a glass transition temperature of less than 125° C. and a weight average molecular weight of 80,000 to less than 150,000.

6. The molded product according to claim 5, characterized in that said α-methylstyrene-based resin is prepared by bulk polymerization.

7. The molded product according to claim 1, characterized in that said thermoplastic resin composition further comprises 0 to 10% by weight of N-phenylmaleimide (PMI)-based heat-resistant resin.

8. The molded product according to claim 1, wherein the molded product has elongation retention of 40% or more in accordance with ASTM D638-10: [provided said elongation retention (%)=(elongation after application of thinner/elongation before application of thinner)×100].

9. A molded product molded by blow molding process using a thermoplastic resin composition,
   wherein the thermoplastic resin composition comprises:
   25 to 50% by weight of a graft copolymer resin of a vinyl cyanide compound-rubbery polymer-aromatic vinyl compound; and
   30 to 75% by weight of α-methylstyrene-based heat-resistant resin having a glass transition temperature (Tg) of 125° C. or more and a weight average molecular weight (Mw) of 150,000 to 250,000,
   wherein the molded product has impact strength of 20 to 35 kg·cm/in accordance with ASTM D256: [provided the specimen with the formed notch and a thickness of ¼" (6.35 mm) is applied].

10. A molded product molded by blow molding process using a thermoplastic resin composition,
    wherein the thermoplastic resin composition comprises:
    25 to 50% by weight of a graft copolymer resin of a vinyl cyanide compound-rubbery polymer-aromatic vinyl compound; and
    30 to 75% by weight of α-methylstyrene-based heat-resistant resin having a glass transition temperature (Tg) of 125° C. or more and a weight average molecular weight (Mw) of 150,000 to 250,000,
    wherein the molded product has a heat deflection temperature of 100 to 120° C. in accordance with ASTM D648-07: [provided the specimen with a thickness of ¼" (6.35 mm) is applied under a load of 18.6 kgf/cm$^2$ and 120/hr].

* * * * *